US008330434B2

(12) United States Patent
Melanson

(10) Patent No.: US 8,330,434 B2
(45) Date of Patent: Dec. 11, 2012

(54) POWER SUPPLY THAT DETERMINES ENERGY CONSUMPTION AND OUTPUTS A SIGNAL INDICATIVE OF ENERGY CONSUMPTION

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 752 days.

(21) Appl. No.: 12/242,024

(22) Filed: Sep. 30, 2008

(65) Prior Publication Data

US 2010/0020579 A1 Jan. 28, 2010

Related U.S. Application Data

(60) Provisional application No. 61/083,717, filed on Jul. 25, 2008.

(51) Int. Cl.
*G05F 1/70* (2006.01)
(52) U.S. Cl. .................................... 323/207; 323/299
(58) Field of Classification Search .................. 323/205, 323/207, 222, 266; 363/89
See application file for complete search history.

(56) References Cited

U.S. PATENT DOCUMENTS

| | | | |
|---|---|---|---|
| 3,316,495 A | 4/1967 | Sherer | |
| 3,423,689 A | 1/1969 | Miller et al. | |
| 3,586,988 A | 6/1971 | Weekes | |
| 3,725,804 A | 4/1973 | Langan | |
| 4,229,795 A * | 10/1980 | Vieweg et al. | 702/61 |
| 4,409,476 A | 10/1983 | Lofgren et al. | |
| 4,523,128 A | 6/1985 | Stamm | |
| 4,683,529 A | 7/1987 | Bucher | |
| 4,700,188 A | 10/1987 | James | |
| 4,737,658 A | 4/1988 | Kronmuller et al. | |
| 4,937,728 A | 6/1990 | Leonardi | |
| 4,980,898 A | 12/1990 | Silvian | |
| 5,001,620 A | 3/1991 | Smith | |
| 5,055,746 A | 10/1991 | Hu et al. | |
| 5,109,185 A | 4/1992 | Ball | |
| 5,121,079 A | 6/1992 | Dargatz | |
| 5,134,355 A * | 7/1992 | Hastings | 323/211 |
| 5,264,780 A | 11/1993 | Bruer et al. | |
| 5,359,180 A | 10/1994 | Park et al. | |
| 5,424,932 A | 6/1995 | Inou et al. | |
| 5,479,333 A | 12/1995 | McCambridge et al. | |
| 5,481,178 A | 1/1996 | Wilcox et al. | |

(Continued)

FOREIGN PATENT DOCUMENTS

DE 19713814 10/1998

(Continued)

OTHER PUBLICATIONS

Power Supply Design Tutorial; http://www.smps.us/power-supply. html.

(Continued)

*Primary Examiner* — Gary L Laxton
(74) *Attorney, Agent, or Firm* — Yudell Isidore Ng Russell PLLC

(57) ABSTRACT

A power supply includes a rectifier having an AC input and a DC output and a power factor correction (PFC) preregulator, coupled to the rectifier, that increases a power factor of the power supply. The PFC preregulator includes a controller that integrates an input power to determine energy consumption and outputs a signal indicative of the energy consumption.

27 Claims, 3 Drawing Sheets

U.S. PATENT DOCUMENTS

| | | | |
|---|---|---|---|
| 5,589,759 A | | 12/1996 | Borgato et al. |
| 5,617,013 A | * | 4/1997 | Cozzi .......................... 323/222 |
| 5,638,265 A | | 6/1997 | Gabor |
| 5,691,890 A | | 11/1997 | Hyde |
| 5,757,635 A | | 5/1998 | Seong |
| 5,764,039 A | | 6/1998 | Choi et al. |
| 5,768,111 A | | 6/1998 | Zaitsu |
| 5,798,635 A | | 8/1998 | Hwang et al. |
| 5,834,858 A | | 11/1998 | Crosman, III et al. |
| 5,912,812 A | | 6/1999 | Moriarty, Jr. |
| 5,946,206 A | | 8/1999 | Shimizu et al. |
| 5,959,852 A | * | 9/1999 | Deloy et al. .................... 363/45 |
| 5,960,207 A | | 9/1999 | Brown |
| 5,962,989 A | | 10/1999 | Baker |
| 5,994,885 A | | 11/1999 | Wilcox et al. |
| 6,028,776 A | * | 2/2000 | Ji et al. ...................... 363/21.05 |
| 6,091,233 A | | 7/2000 | Hwang |
| 6,125,046 A | | 9/2000 | Jang et al. |
| 6,181,114 B1 | | 1/2001 | Hemena et al. |
| 6,229,292 B1 | | 5/2001 | Redl et al. |
| 6,300,723 B1 | | 10/2001 | Wang et al. |
| 6,304,066 B1 | | 10/2001 | Wilcox et al. |
| 6,343,026 B1 | | 1/2002 | Perry |
| 6,369,525 B1 | | 4/2002 | Chang et al. |
| 6,407,514 B1 | | 6/2002 | Glaser et al. |
| 6,407,515 B1 | | 6/2002 | Hesler |
| 6,441,558 B1 | | 8/2002 | Muthu et al. |
| 6,469,484 B2 | | 10/2002 | L'Hermite et al. |
| 6,493,246 B2 | * | 12/2002 | Suzui et al. .................... 363/95 |
| 6,495,964 B1 | | 12/2002 | Muthu et al. |
| 6,507,507 B2 | * | 1/2003 | Tokunaga et al. .............. 363/89 |
| 6,531,854 B2 | | 3/2003 | Hwang |
| 6,580,258 B2 | | 6/2003 | Wilcox et al. |
| 6,628,106 B1 | | 9/2003 | Batarseh et al. |
| 6,646,848 B2 | | 11/2003 | Yoshida et al. |
| 6,657,417 B1 | | 12/2003 | Hwang |
| 6,688,753 B2 | | 2/2004 | Calon et al. |
| 6,724,174 B1 | | 4/2004 | Esteves et al. |
| 6,727,832 B1 | | 4/2004 | Melanson |
| 6,737,845 B2 | | 5/2004 | Hwang |
| 6,753,661 B2 | | 6/2004 | Muthu et al. |
| 6,756,772 B2 | | 6/2004 | McGinnis |
| 6,963,496 B2 | | 11/2005 | Bimbaud |
| 6,975,523 B2 | | 12/2005 | Kim et al. |
| 6,980,446 B2 | | 12/2005 | Simada et al. |
| 7,034,611 B2 | | 4/2006 | Oswal et al. |
| 7,072,191 B2 | | 7/2006 | Nakao et al. |
| 7,082,374 B2 | * | 7/2006 | Ranta .............................. 702/60 |
| 7,099,163 B1 | | 8/2006 | Ying |
| 7,126,288 B2 | | 10/2006 | Ribarich et al. |
| 7,180,250 B1 | | 2/2007 | Gannon |
| 7,246,919 B2 | | 7/2007 | Porchia et al. |
| 7,276,861 B1 | | 10/2007 | Shteynberg et al. |
| 7,288,902 B1 | | 10/2007 | Melanson |
| 7,345,458 B2 | | 3/2008 | Kanai et al. |
| 7,359,224 B2 | * | 4/2008 | Li ...................................... 363/89 |
| 7,375,476 B2 | | 5/2008 | Walter et al. |
| 7,388,764 B2 | | 6/2008 | Huynh et al. |
| 7,394,210 B2 | | 7/2008 | Ashdown |
| 7,511,437 B2 | | 3/2009 | Lys et al. |
| 7,538,499 B2 | | 5/2009 | Ashdown |
| 7,554,473 B2 | | 6/2009 | Melanson |
| 7,569,996 B2 | | 8/2009 | Holmes et al. |
| 7,583,136 B2 | | 9/2009 | Pelly |
| 7,646,189 B2 | * | 1/2010 | Chen .............................. 323/285 |
| 7,656,103 B2 | | 2/2010 | Shteynberg et al. |
| 7,667,986 B2 | | 2/2010 | Artusi et al. |
| 7,710,047 B2 | | 5/2010 | Shteynberg et al. |
| 7,719,246 B2 | | 5/2010 | Melanson |
| 7,719,248 B1 | | 5/2010 | Melanson |
| 7,746,043 B2 | | 6/2010 | Melanson |
| 7,746,671 B2 | | 6/2010 | Radecker et al. |
| 7,750,738 B2 | | 7/2010 | Bach |
| 7,756,896 B1 | | 7/2010 | Feingold |
| 7,777,563 B2 | | 8/2010 | Midya et al. |
| 7,804,256 B2 | | 9/2010 | Melanson |
| 7,804,480 B2 | | 9/2010 | Jeon et al. |
| 7,906,941 B2 | * | 3/2011 | Jayaraman et al. ........... 323/222 |
| 7,908,505 B2 | * | 3/2011 | Malik et al. .................... 713/340 |
| 2002/0065583 A1 | | 5/2002 | Okada |
| 2003/0174520 A1 | | 9/2003 | Bimbaud |
| 2004/0004465 A1 | | 1/2004 | McGinnis |
| 2005/0168492 A1 | | 8/2005 | Hekstra et al. |
| 2005/0197952 A1 | | 9/2005 | Shea et al. |
| 2005/0207190 A1 | | 9/2005 | Gritter |
| 2005/0222881 A1 | | 10/2005 | Booker |
| 2005/0270813 A1 | | 12/2005 | Zhang et al. |
| 2005/0275386 A1 | | 12/2005 | Jepsen et al. |
| 2006/0002110 A1 | | 1/2006 | Dowling |
| 2006/0116898 A1 | | 6/2006 | Peterson |
| 2006/0184414 A1 | | 8/2006 | Pappas et al. |
| 2006/0214603 A1 | | 9/2006 | Oh et al. |
| 2006/0238136 A1 | | 10/2006 | Johnson, III et al. |
| 2006/0285365 A1 | | 12/2006 | Huynh et al. |
| 2007/0024213 A1 | | 2/2007 | Shteynberg et al. |
| 2007/0055564 A1 | | 3/2007 | Fourman |
| 2007/0124615 A1 | | 5/2007 | Orr |
| 2007/0126656 A1 | | 6/2007 | Huang et al. |
| 2007/0285031 A1 | | 12/2007 | Shteynberg et al. |
| 2008/0012501 A1 | | 1/2008 | Lys |
| 2008/0027841 A1 | | 1/2008 | Eder |
| 2008/0043504 A1 | | 2/2008 | Ye et al. |
| 2008/0054815 A1 | | 3/2008 | Kotikalapoodi et al. |
| 2008/0116818 A1 | | 5/2008 | Shteynberg et al. |
| 2008/0130322 A1 | | 6/2008 | Artusi et al. |
| 2008/0130336 A1 | | 6/2008 | Taguchi |
| 2008/0150433 A1 | | 6/2008 | Tsuchida et al. |
| 2008/0154679 A1 | | 6/2008 | Wade |
| 2008/0174291 A1 | | 7/2008 | Hansson et al. |
| 2008/0175029 A1 | | 7/2008 | Jung et al. |
| 2008/0224635 A1 | | 9/2008 | Hayes |
| 2008/0232141 A1 | | 9/2008 | Artusi et al. |
| 2008/0239764 A1 | | 10/2008 | Jacques et al. |
| 2009/0067204 A1 | | 3/2009 | Ye et al. |
| 2009/0070188 A1 | | 3/2009 | Scott et al. |
| 2009/0174479 A1 | | 7/2009 | Yan et al. |
| 2009/0218960 A1 | | 9/2009 | Lyons et al. |
| 2010/0141317 A1 | | 6/2010 | Szajnowski |

FOREIGN PATENT DOCUMENTS

| | | |
|---|---|---|
| EP | 0632679 | 1/1995 |
| EP | 0838791 | 4/1998 |
| EP | 1460775 | 9/2004 |
| EP | 2204905 A1 | 7/2010 |
| GB | 2069269 A | 8/1981 |
| WO | W09725836 | 7/1997 |
| WO | 01/15316 A1 | 1/2001 |
| WO | 02/15386 A2 | 2/2002 |
| WO | W02006013557 | 2/2006 |
| WO | W02008072160 | 6/2008 |
| WO | W02008152838 | 12/2008 |

OTHER PUBLICATIONS

ST Datasheet L6562, Transition-Mode PFC Controller, 2005, STMicroelectronics, Geneva, Switzerland.

Maksimovic, Regan Zane and Robert Erickson, Impact of Digital Control in Power Electronics, Proceedings of 2004 International Symposium on Power Semiconductor Devices & Ics, Kitakyushu, Apr. 5, 2010, Colorado Power Electronics Center, ECE Department, University of Colorado, Boulder, CO.

Mamano, Bob, "Current Sensing Solutions for Power Supply Designers", Unitrode Seminar Notes SEM1200, 1999.

http://toolbarpdf.com/docs/functions-and-features-of-inverters.html printed on Jan. 20, 2011.

Texas Instruments, Interleaving Continuous Conduction Mode PFC Controller, UCC28070, SLUS794C, Nov. 2007, revised Jun. 2009, Texas Instruments, Dallas TX.

* cited by examiner

POWER SUPPLY THAT DETERMINES ENERGY CONSUMPTION AND OUTPUTS A SIGNAL INDICATIVE OF ENERGY CONSUMPTION

PRIORITY CLAIM AND CROSS-REFERENCE

The present application claims priority to U.S. Provisional Patent Application 61/083,717, filed Jul. 25, 2008, which is incorporated herein by reference in its entirety.

BACKGROUND OF THE INVENTION

1. Technical Field

The present invention relates in general to electrical circuits, and in particular, to a power supply with accurate energy measurement.

2. Description of the Related Art

In view of the high cost of electrical power and concern for the environment, there has been increased focus on energy efficiency, both by regulatory and standards bodies and by end users of electrical and electronic equipment.

The desire to increase the energy efficiency of electrical and electronic equipment has led to the wide adoption of power saving features, such as a Sleep state and auto-power down, in electrical and electronic equipment. In the Sleep state, equipment has greater power consumption, capability, and responsiveness than in an Off state, but less power consumption, and generally less capability and responsiveness than it does in its fully powered On state. Auto-power down further enables the equipment to automatically switch from its fully powered. On state to the lower powered Sleep state after a period of time without user input.

One advantage of the foregoing and other power saving features is that they are inherent in the design of the equipment, and no user input is required to achieve decreased energy consumption as compared to similar conventional equipment lacking such power saving features. However, it will be appreciated that additional power savings can be achieved if active human participation is encouraged.

SUMMARY OF THE INVENTION

In at least one embodiment, human participation in energy conservation is encouraged by determining and reporting an amount of energy consumed by electrical equipment. For example, in one embodiment, a power supply includes a rectifier having an AC input and a DC output and a power factor correction (PFC) preregulator, coupled to the rectifier, that increases a power factor of the power supply. The PFC preregulator includes a controller that integrates an input power to determine energy consumption and outputs a signal indicative of the energy consumption.

BRIEF DESCRIPTION OF THE DRAWINGS

The present invention, as well as a preferred mode of use, will best be understood by reference to the following detailed description of one or more illustrative embodiments when read in conjunction with the accompanying drawings, wherein.

DETAILED DESCRIPTION OF ILLUSTRATIVE EMBODIMENT

Figure 1:
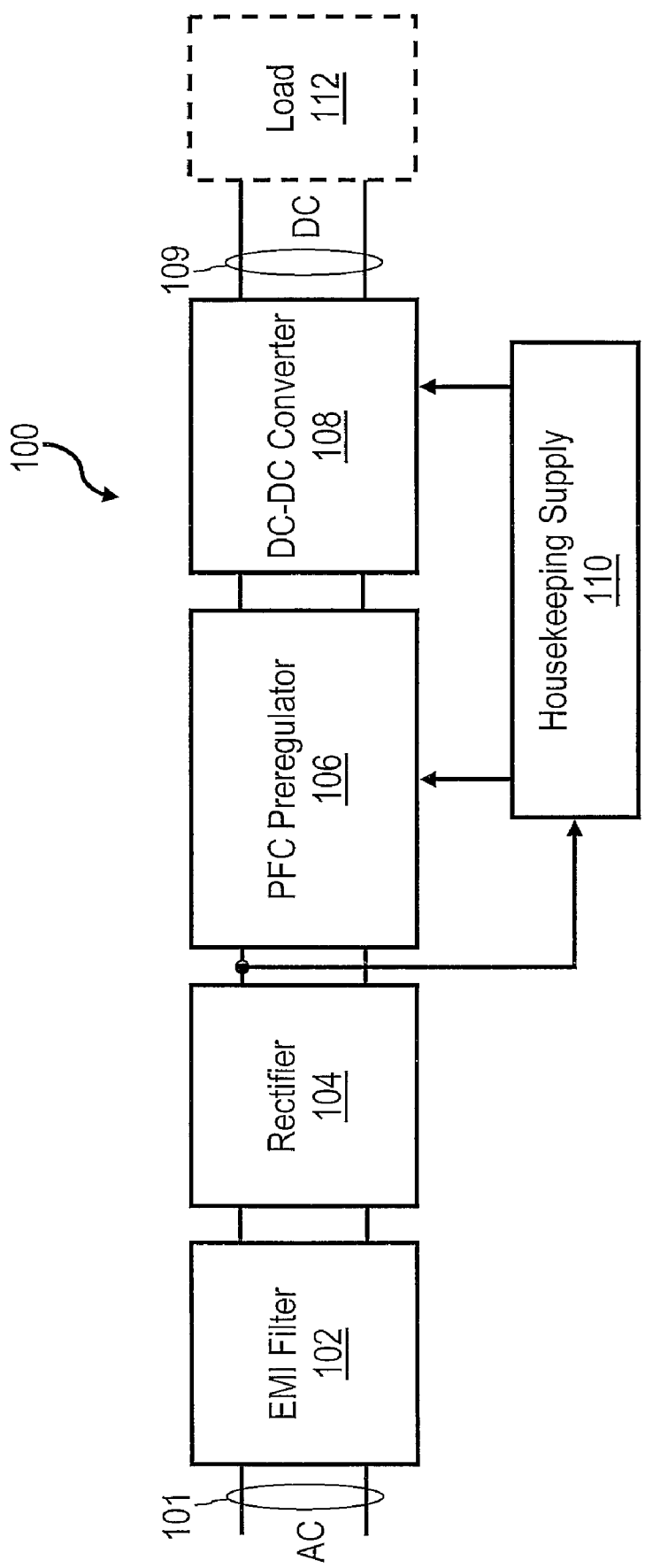
FIG. 1 is a high level block diagram of an AC-to-DC power supply in accordance with one embodiment.

With reference now to the figures and in particular with reference to FIG. 1, there is illustrated a high level block diagram of an exemplary power supply 100 in accordance with one embodiment. In the depicted embodiment, power supply 100 is an off-line switched-mode power supply (SMPS) that converts AC (alternating current) power supplied by an AC source into regulated DC (direct current) power for a DC load 112, such as electronic equipment.

As shown, power supply 100 has an AC input 101 that receives AC power from an AC power source, such as an AC power outlet. In a preferred embodiment, power supply 100 supports so-called universal operation within the voltage range of 85-265V AC. Thus, the nominal system voltage of the AC power may be, for example, 230 V at 50 Hz (the European standard), 120V or 240V at 60 Hz (as utilized in the United States), or some other combination of voltage and frequency. It will be appreciated that in most industrialized nations, the nominal system voltage and frequency are controlled by power utilities to within a small percentage of nominal values. Tight control of the AC frequency enables the use of the frequency to construct a time base for computation, as discussed further below.

Power supply 100 typically includes a low pass electromagnetic interference (EMI) filter 102 to reduce coupling of switching noise of power supply 100 onto the AC power line. EMI filter 102 commonly includes one or more capacitive elements to impede high frequency harmonic currents generated by the switching of power supply 100 from appearing on the AC power line and one or more inductive elements to limit in-rush current. Following the filtering provided by EMI filter 102, a rectifier 104, such as a full-bridge rectifier, is utilized to convert the bipolar AC input voltage into unipolar DC voltage.

A power factor correction (PFC) preregulator 106 is coupled to the output of rectifier 104. PFC preregulator 106 improves the power factor (i.e., the ratio of real power and apparent power) of the power drawn by power supply 100. As is well known to those skilled in the art, the power factor is increased by controlling the input current so that it is in phase or nearly in phase with the input voltage waveform.

Power supply 100 may optionally further include a DC-DC converter 108 that converts the DC voltage provided by PFC preregulator 106 into one or more DC output voltages at its DC output 109 required by the intended load 112. DC-DC converter 108 commonly employs a transformer to step-up or step-down the DC voltage and to provide isolation between the input and output. Common topologies for DC-DC converter 108 includes, among others, boost mode, buck mode and flyback.

In order to provide biasing voltages for active components and standby power for the control circuitry of PFC preregulator 106, power supply 100 further includes a housekeeping supply 110. Thus, power supply 100 continues to consume a relatively small amount of power even when power supply 100 is not supplying power to downstream load 112.

Figure 2:
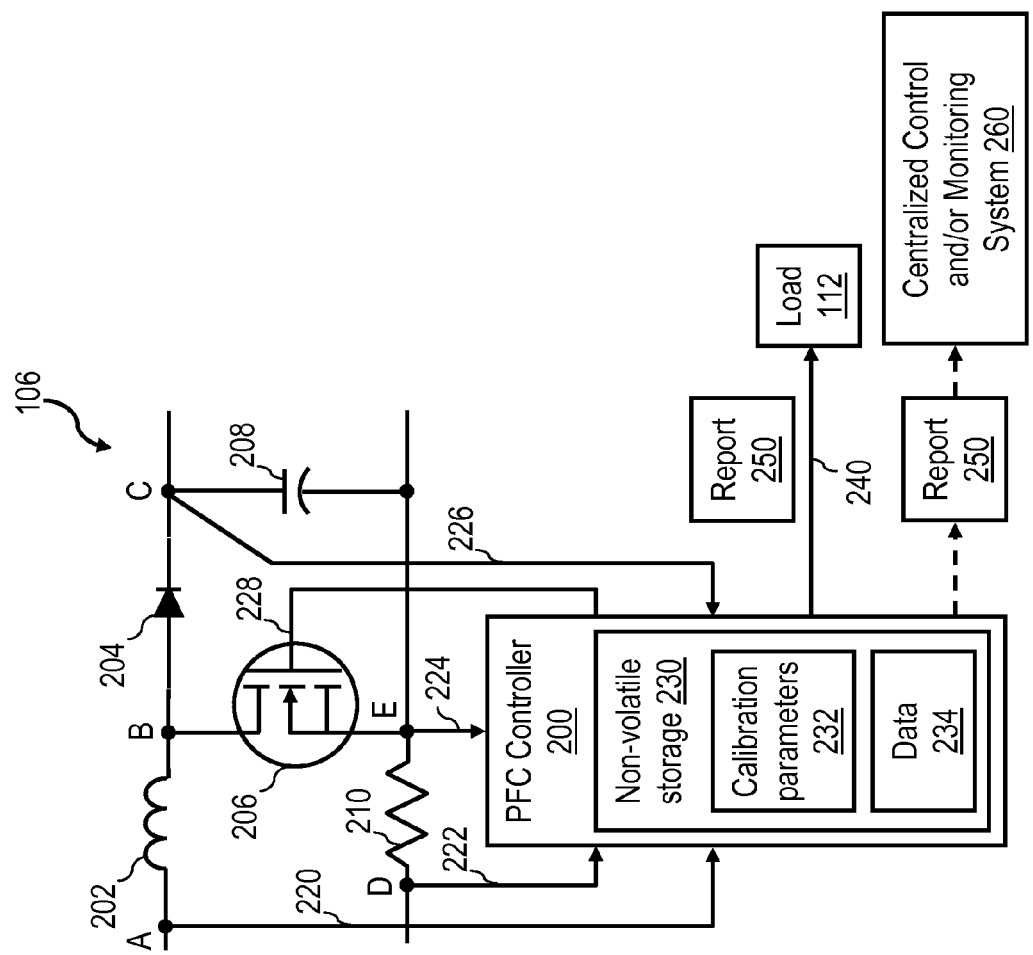
FIG. 2 is a more detailed block diagram of an exemplary power factor correction (PFC) preregulator in accordance with one embodiment.

Referring now to FIG. 2, there is depicted a more detailed block diagram of an exemplary power factor correction (PFC) preregulator 106 in accordance with one embodiment. Although the depicted embodiment is an actively controlled boost mode PFC preregulator, it should be appreciated that other embodiments of PFC preregulator 106 (e.g., buck or buck-boost) are possible and fall within the scope of the appended claims.

In the depicted embodiment, PFC preregulator 106 has a differential input at nodes A and D that receives a rectified AC voltage waveform from rectifier 104. An inductor 202 is coupled between input node A and node B, and a diode 204 is coupled between node B and a first output node C. A sense resistor 210 is coupled between node D and a second output node E, a switch 206, such as a field-effect transistor (FET), is coupled between nodes B and E, and a capacitor 208 (typically of large value) is coupled across output nodes C and E to smooth the ripple in the DC output voltage.

PFC preregulator 106 finally includes a PFC controller 200 that controls the input current of power supply 100 by selectively operating switch 206 based upon feedback sensed, for example, at nodes A, C, D and E. In the illustrated embodiment, PFC controller 200 receives the DC input voltage across input nodes A and D from voltage sense signals 220 and 222 and receives the DC output voltage across output nodes C and E from voltage sense signals 226 and 224. Further, PFC controller 200 determines the current through inductor 202 from the sensed voltage drop across resistor 210 indicated by voltage sense signals 222 and 224.

When PFC controller 200 turns switch 206 on, for example, by asserting gate control line 228, inductor 202 is effectively coupled across rectifier 204 and is energized with current. When PFC controller 200 turns switch 206 off, for example, by asserting gate control line 228, inductor 202 releases the stored energy via diode 204 and DC-DC converter 108 to load 112. As is well known in the art, PFC controller 200 controls the timing and duration of switching of switch 206 so that the current drawn by inductor 202 (which is sensed via voltage sense signals 222 and 224) is in phase with the line voltage, thus increasing the power factor toward one.

PFC controller 200 can be implemented in analog circuitry, but for ease of design is preferably realized as one or more digital integrated circuits. As depicted, PFC controller 200 preferably includes or is coupled to non-volatile storage 230, which can be implemented, for example, as flash memory, non-volatile read-only memory (NVRAM), and/or other non-volatile storage as is known in the art. Within non-volatile storage 230, PFC controller 200 stores, inter alia, calibration parameters 232 utilized in the computations of PRC controller 200 and data 234, which can include data resulting from the computations of PRC controller 200, as discussed further below with reference to FIG. 3.

With the use of a digital integrated circuit, PFC controller 200 can be utilized not only to effectively implement power factor correction, but also to determine other desirable data, such as the energy consumed by power supply 100 and/or load 112. For example, input power is given as:

$$P_{in} = I_{in} \times V_{in} \quad [1]$$

where $V_{in}$ is the RMS (root mean squared) voltage. PFC controller 200 controls input current $I_{in}$ as a function of voltage $V_{in}$ according to:

$$I_{in} = k \times V_{in} \quad [2]$$

where PFC controller 200 adjusts k as part of the supply feedback operation. Substitution of equation [2] into equation [1] yields the following relation:

$$P_{in} = k \times V_{in}^2 \quad [3]$$

PFC controller 200 further determines energy consumption as follows:

$$E = \int P_{in} = \int (k \times V_{in}^2) \quad [4]$$

Figure 3:
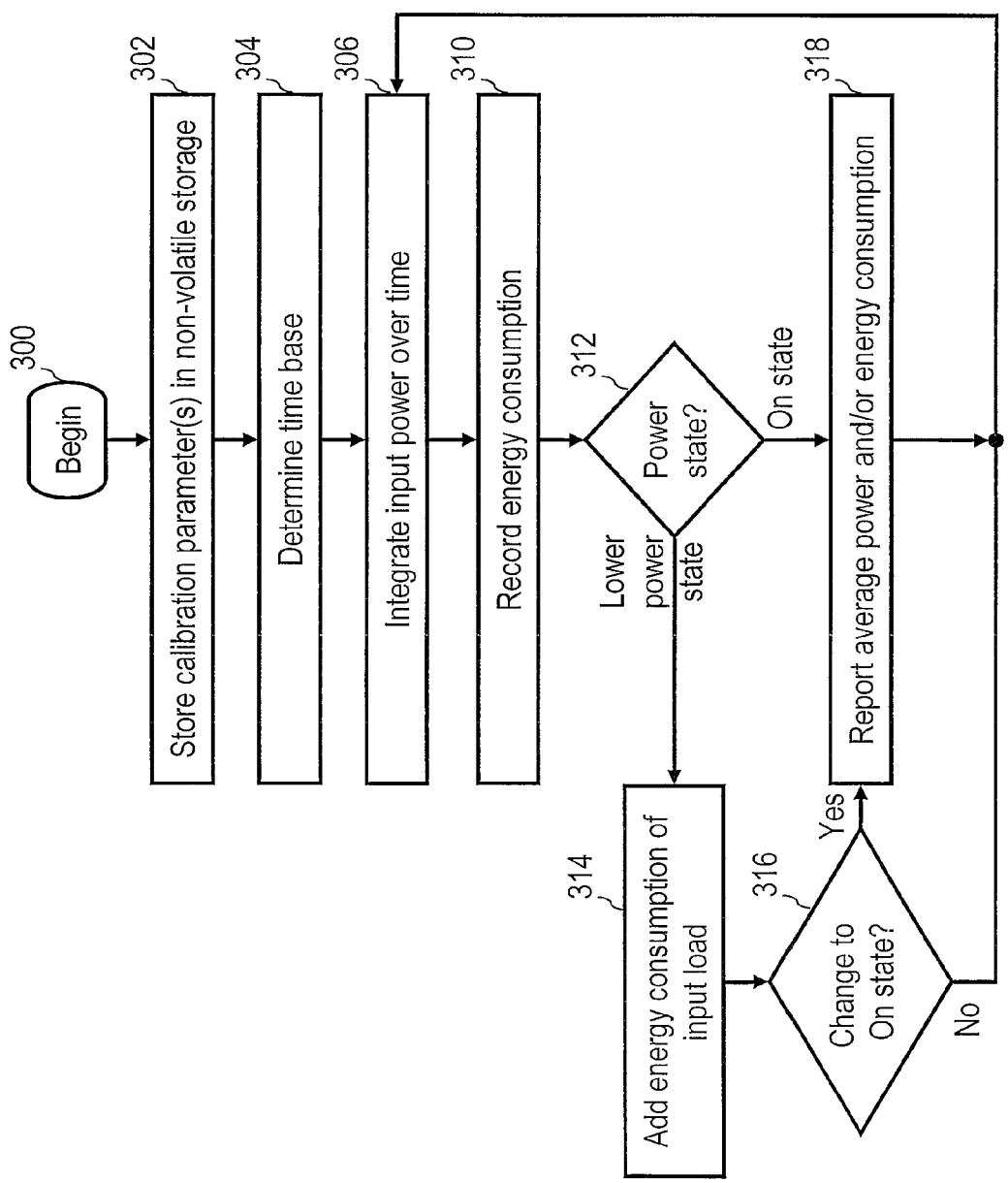
FIG. 3 is a high level logical flowchart of an exemplary process of energy measurement in accordance with one embodiment.

With reference now to FIG. 3, there is illustrated a high level logical flowchart of an exemplary process of energy measurement implemented by PFC controller 200 in accordance with one embodiment. As a logical flowchart, at least some of the illustrated steps can be performed concurrently and/or in a different order than that shown. Further, in other embodiments, at least some steps can be omitted and/or additional steps can be included, as will become apparent from the following description As depicted, the process begins at block 300 and then proceeds to block 302, which illustrates storage of calibration parameters 232 in non-volatile storage 230. These calibration parameters 232, which need only be stored into non-volatile storage 230 once (e.g., during the manufacturing process for power supply 100), can include, for example, the values of inductor 202, sense resistor 210 and capacitor 208 if the embodiment of FIG. 2 is implemented. Of course, if PFC preregulator 106 has a different topology, other calibration parameters 232 will be stored.

Subsequently during use, PFC controller 200 determines a time base to be utilized for the computation of the energy consumption by integration of the input power, as set forth in equation [4] (block 304). In various embodiments, PFC controller 200 can determine the time base, for example, from the values of the components of a resonant circuit (e.g., L-C or R-C) within PFC preregulator 106, from a timing crystal coupled to PFC controller 200, or from the AC line frequency as is known in the art. With the time base determined, PFC controller 200 integrates the input power over time to determine the energy consumption of power supply 100 in accordance with equation [4] (block 306). In calculating the input power and energy consumption, PFC controller 200 accesses the calibration parameters 232 stored in non-volatile storage 230 in order to determine k.

Next, at block 310, PFC controller 200 optionally records the energy consumption over the time base as data 234 in non-volatile storage 230. For example, PFC controller 200 may record the energy consumption as a single accumulating value reset when power is cycled, as a value since the energy consumption was last reported, and/or as energy consumption over a predetermined number of time base intervals. If energy consumption over each predetermined number of time base intervals is recorded, the values can be organized in an order-preserving data structure within non-volatile storage 230, such as a circular buffer.

At block 312, PFC controller 200 determines the current power state of power supply 100. In response to a determination at block 312 that the current power state is a full power On state, then PFC controller 200 reports an average power and/or energy consumption. The report 250 communicated at block 318 can be delivered, for example, via signal line 240 to a downstream load 112 such as consumer electronics or a computer system, or may alternatively or additionally be delivered to a centralized control and/or monitoring system 260 communicatively coupled via a wired or wireless interface to multiple power supplies. The reporting illustrated at block 318 can be performed at regular intervals of time or energy consumption, and alternatively or additionally, in response to a request by the recipient of the report.

Returning to block 312, in response to determining that the current power state of power supply 100 is a lower power state than the On state, such as a Sleep (or standby) state, PFC controller 200 augments the energy consumption determined at block 306 with the energy dissipation of PFC controller 200, sense resistor 210, capacitor 208, housekeeping supply 110 and any other input load (block 314). Although the energy consumption of the input loads can optionally be included in the reporting while in the On state, the energy consumption of the input loads may be negligible in the On state, but will be substantial or predominate in a lower power state, such as a Sleep state. As indicated at block 316, in at least one embodiment, PFC controller 200 defers any reporting of the average power and/or energy consumption as depicted at block 318 until power supply 100 transitions to the On state. Following block 316 or block 318, the process returns to block 306, which has been described.

As has been described, human participation in energy conservation can be encouraged by determining and reporting an amount of energy consumed by electrical equipment. In at least one embodiment, a power supply includes a rectifier having an AC input and a DC output and a power factor correction (PFC) preregulator, coupled to the rectifier, that increases a power factor of the power supply. The PFC preregulator includes a controller that integrates an input power to determine energy consumption and outputs a signal indicative of the energy consumption. Consequently, power consumption can be accurately determined at the power supply rather than merely estimated by downstream equipment.

While the present invention has been particularly shown as described with reference to one or more preferred embodiments, it will be understood by those skilled in the art that various changes in form and detail may be made therein without departing from the spirit and scope of the invention.

What is claimed is:

1. A power supply, comprising:
   a rectifier having an AC input and a DC output; and
   a power factor correction (PFC) preregulator, coupled to the rectifier, that increases a power factor of the power supply, wherein the PFC preregulator includes a PFC controller that integrates an input power to determine energy consumption and outputs a signal indicative of the energy consumption, and wherein the PFC controller further determines a power state of the power supply and outputs the signal in response to determining the power supply is in a higher power state and refrains from outputting the signal in response to determining the power supply is in a lower power state having a power consumption intermediate the higher power state and an OFF state.

2. The power supply of claim 1, wherein:
   the PFC controller has a non-volatile memory that stores a calibration parameter utilized by the PFC controller to determine the energy consumption.

3. The power supply of claim 1, wherein the energy consumption includes an energy consumption of an input load in the PFC preregulator.

4. The power supply of claim 1, wherein the PFC controller determines a time base for integrating the input power from an AC line frequency.

5. The power supply of claim 1, wherein the signal indicative of the energy consumption indicates average power over a time interval.

6. The power supply of claim 1, and further comprising a DC-to-DC converter coupled to the PFC preregulator.

7. The power supply of claim 1, and further comprising an electromagnetic interference (EMI) filter coupled to the rectifier.

8. The power supply of claim 1, wherein the PFC controller controls the PFC preregulator independently of the energy consumption.

9. The power supply of claim 1, wherein the power supply reports at least one of a set including power consumption and energy consumption to a downstream load coupled to receive power from the power supply.

10. The power supply of claim 1, wherein the power supply reports at least one of a set including power consumption and energy consumption to a power monitoring system communicatively coupled to the power supply.

11. A method of operating a power supply, said method comprising:
    rectifying an AC input;
    applying, by a power factor correction (PFC) preregulator, power factor correction to increase a power factor of the power supply;
    determining, by a PFC controller of the PFC preregulator, energy consumption by integrating an input power;
    determining, by the PFC controller, a power state of the power supply; and
    outputting, by the PFC controller, a signal indicative of the energy consumption in response to determining the power supply is in a higher power state and refraining from outputting the signal in response to determining the power supply is in a lower power state having a power consumption intermediate the higher power state and an OFF state.

12. The method of claim 11, and further comprising:
    storing a calibration parameter utilized by the controller to determine the energy consumption in a non-volatile memory.

13. The method of claim 11, wherein determining energy consumption includes calculating energy consumption of an input load in the PFC preregulator.

14. The method of claim 11, and further comprising the PFC controller determining from an AC line frequency a time base for integrating the input power.

15. The method of claim 11, wherein outputting a signal indicative of the energy consumption comprises outputting a signal indicating average power over a time interval.

16. The method of claim 11, wherein said applying power factor correction includes applying power factor correction independently of the energy consumption.

17. The method of claim 11, and further comprising the power supply reporting at least one of a set including power consumption and energy consumption to a downstream load coupled to receive power from the power supply.

18. The method of claim 11, and further comprising the power supply reporting at least one of a set including power consumption and energy consumption to a power monitoring system communicatively coupled to the power supply.

19. A circuit for controlling a power supply, the circuit comprising:
    a power factor correction (PFC) controller that controls current flow in a PFC preregulator to increase a power factor of the power supply, wherein the PFC controller integrates an input power to determine energy consumption and outputs a signal indicative of the energy consumption; and
    wherein the PFC controller further determines a power state of the power supply and outputs the signal in response to determining the power supply is in a higher power state and refrains from outputting the signal in response to determining the power supply is in a lower power state having a power consumption intermediate the higher power state and an OFF state.

20. The circuit of claim 19, wherein:
    the PFC controller includes a non-volatile memory that stores a calibration parameter utilized by the PFC controller to determine the energy consumption.

21. The circuit of claim 19, wherein the energy consumption includes an energy consumption of an input load within the PFC preregulator.

22. The circuit of claim 19, wherein the PFC controller determines a time base for integrating the input power from an AC line frequency.

23. The circuit of claim 19, wherein the signal indicative of the energy consumption indicates average power over a time interval.

24. The circuit of claim 19 wherein the circuit is embodied in an integrated circuit.

25. The circuit of claim 24, wherein the integrated circuit reports at least one of a set including power consumption and energy consumption to a power monitoring system communicatively coupled to the integrated circuit.

26. The circuit of claim 19, wherein the PFC controller controls the PFC preregulator independently of the energy consumption.

27. The circuit of claim 24, wherein the integrated circuit reports at least one of a set including power consumption and energy consumption to a downstream load coupled to receive power from the integrated circuit.

* * * * *